United States Patent [19]
Marshall et al.

[11] Patent Number: 4,955,491
[45] Date of Patent: Sep. 11, 1990

[54] PLASTIC CONTAINER WITH REINFORCING RING IN THE BASE

[75] Inventors: Dennis L. Marshall, Wauwatosa, Wis.; Dale H. Behm, Ann Arbor, Mich.; Theodore F. Eberle, Saline, Mich.; Thomas F. Powers, Ypsilanti, Mich.

[73] Assignee: Hoover Universal, Inc., Ann Arbor, Mich.

[21] Appl. No.: 345,294

[22] Filed: May 1, 1989

[51] Int. Cl.$^5$ ............................................. B65D 25/24
[52] U.S. Cl. ................................. 215/12.1; 215/1 C;
215/100 R; 220/69
[58] Field of Search ................ 215/1 C, 12.1, 100 R;
220/66, 69, 70

[56] References Cited

U.S. PATENT DOCUMENTS

| | | | |
|---|---|---|---|
| 2,837,245 | 6/1958 | Grebowiec | 215/1 C X |
| 3,722,725 | 3/1973 | Khetani et al. | 215/12.1 X |
| 3,838,789 | 10/1974 | Cuacho | 220/69 X |
| 4,127,207 | 11/1978 | Hubert et al. | 220/69 X |
| 4,140,236 | 2/1979 | Uhlig et al. | 220/69 X |
| 4,305,772 | 12/1981 | Valyi | 215/1 C X |
| 4,326,638 | 4/1982 | Nickel et al. | 215/12.1 |
| 4,381,061 | 4/1983 | Cerny et al. | 220/66 X |
| 4,463,860 | 8/1984 | Yoshino et al. | 220/69 X |
| 4,573,597 | 3/1986 | Adams et al. | 215/100 R X |

FOREIGN PATENT DOCUMENTS

| | | | |
|---|---|---|---|
| 2159805 | 6/1972 | Fed. Rep. of Germany | 215/100 R |
| 2510457 | 10/1975 | Fed. Rep. of Germany | 215/1 C |
| 490676 | 2/1954 | Italy | 220/69 |
| 497177 | 9/1955 | Italy | 215/12.1 |
| 697360 | 11/1965 | Italy | 215/12.1 |
| 1175048 | 12/1969 | United Kingdom | 215/1 C |

Primary Examiner—Sue A. Weaver
Attorney, Agent, or Firm—Harness, Dickey & Pierce

[57] ABSTRACT

A plastic container having a reinforcing ring in its base to strengthen the base. The ring reinforces the base to prevent deformation of the base which would result in an unstable container and also reduces the potential for stress cracking found in one-piece containers having reinforcing ribs in the base structure. The reinforcing ring has a weight that is less than the weight of a typical base cup used to provide a supporting surface for a two-piece composite bottle. The ring is attached to the base portion of the container by one of three methods: molding the reinforcing ring into the base; providing a ring and a base which snap fit together, or adhesively bonding the ring to the base of the container. When the contianer is filled with a carbonated beverage, the pressure within the container acts to maintain the ring in an assembly relation with the container base in which the ring reinforces the base and acts to maintain the structural integrity of the base by resisting eversion of the base.

20 Claims, 7 Drawing Sheets

PLASTIC CONTAINER WITH REINFORCING RING IN THE BASE

BACKGROUND OF THE INVENTION

The present invention relates to plastic containers and in particular to a plastic container having a reinforcing ring in its base to strengthen the base.

In recent years, the use of plastic containers for beverages, and particularly carbonated beverages, has increased dramatically. These containers are typically blow molded from an injection molded polyethylene terephthalate (PET) preform. A difficulty, however, with the use of plastic containers for carbonated beverages is in providing sufficient strength in the container base. The internal pressure in a container filled with a carbonated beverage can range from approximately 60 psig at room temperature to as high as 100 psig at 100° F. These pressures can produce deformation of the base portion of the container which may result in a container which does not have a flat bottom surface perpendicular to the upright axis of the bottle such that the bottle will no longer stand upright on a horizontal supporting surface. In addition to stability problems with a deformed base, when the container base is deformed, the volume of the bottle typically increases. This results in a lowering of the liquid fill line such that consumers may be led to believe that the bottle was not properly filled or sealed.

One solution of the problem of distortion in the container base is to blow mold the container with a hemispherical base extending downward from the side wall of the container. In order to support a container with a rounded hemispherical bottom, it is necessary to attach a second plastic piece to the rounded bottom to function as a support stand for the bottle. This second piece, often referred to as a base cup, includes a bottom wall and a generally cylindrical upstanding wall extending upwardly from the bottom wall. The base cup is telescoped over the hemispherical end of the container and typically conceals the rounded hemispherical end. The hemispherical end of the container is often glued to the bottom wall of the base cup to hold the base cup to the bottle. This bottom wall serves as a planar surface upon which the container can be supported in an upright manner.

A major disadvantage with a base cup container is the additional material cost required to form the base cup. Base cups are typically molded of polyethylene which has recently increased dramatically in price. The polyethylene base cup contributes almost half of the container material costs while representing approximately one third of the material weight. Another difficulty with the use of PET bottles and polyethylene base cups is recycling the plastic materials in the container. Before the plastic can be reground, the PET bottle must be separated from the polyethylene base cup.

The problems associated with base cup containers have encouraged efforts to develop one piece self supporting containers. One such container is disclosed in U.S. Pat. No. 3,598,270 issued to Adomaitis. The Adomaitis container has a generally hemispherical bottom with a plurality of hollow legs extending downwardly from the hemispherical base forming feet at the lowermost surface of the container. This container also has disadvantages. It is difficult to obtain adequate flow of plastic into the foot cavities in the mold to fully form the container feet without over compensating and wasting plastic material in the base of the container. The possibility of stress cracking in the container base is a definite problem and the pressure of the container contents tends to distort the base so that it will not sit flat.

Accordingly, it is an object of the invention to provide a container which can be more economically produced than a typical base cup container or a typical one-piece container.

It is a further object of the invention to provide a container in which stress cracking of the base is eliminated and the plastic is efficiently distributed in the container.

Another object of the invention is to provide a non-base cup container in which distortion of the base is avoided by a reinforcing ring held in place in the base by the pressure of the container contents.

It is a feature of the present invention to provide a blow molded bottle with a plastic reinforcing ring attached to the base to strengthen the base.

It is an advantage of the invention that the entire container can be constructed of one plastic material such that separation of the container and the reinforcing ring is not necessary prior to recycling the material used in the container.

SUMMARY OF THE INVENTION

The plastic container of this invention includes a plastic bottle having a generally cylindrical side wall with a base structure at its lower end. The base structure includes a bottom wall extending downwardly from the container side wall, the center or polar portion of the bottom wall is inverted upward into the container forming a dome in the center of the base. This type of base structure is often referred to as a champagne bottle base. The container of this invention also includes an additional plastic reinforcing ring which is attached to or embedded in the base to strengthen the base and prevent distortion and stress cracking of the base. The reinforcing ring can take a variety of shapes and may include a bottom surface which engages a horizontal surface for supporting the container in an upright position thereon.

The reinforcing ring can be attached to the blow molded bottle in one of several methods. In one method, the reinforcing ring is placed in the blow mold cavity in which the hollow bottle is molded. During the blow molding operation, the plastic material in the preform is molded around the ring so as to at least partially encapsulate the ring to retain the ring on the base. In a second method, the base of the bottle is molded with an annular recess into which the reinforcing ring is snap fit to attach the ring to the bottle base. Adhesive can also be applied to the snap fit ring to strengthen the bond between the base and the ring.

In all embodiments, the ring is configured and assembled with the base so as to utilize the forces resulting from the pressure of the carbonated liquid contents of the bottle to maintain the ring in an assembly relation with the bottle in which the ring reinforces the base and acts to maintain the structural integrity of the base.

The reinforcing ring can be configured such that it extends downwardly below the blow molded bottle and forms a planar lowermost surface for supporting the container upright on a horizontal surface. The ring can be made of several different configurations providing a mechanical interfitting engagement or a frictional engagement with the bottle to retain the ring on the bottle.

In addition, the ring can include a number of holes therethrough to reduce the material in the ring and thereby reduce the weight of the container.

The reinforcement provided by the ring can reduce stress cracking of the base to the extent that it is no longer of concern. The material weight in the reinforcing ring is considerably lower than that used in a typical base cup. In addition, the support ring, which is injection molded, can be made from excess or scrap material from other manufacturing processes so the cost of the material in the ring is negligible.

Further objects, features and advantages of the invention will become apparent from a consideration of the following description and the appended claims when taken in connection with the accompanying drawings.

DETAILED DESCRIPTION OF THE INVENTION

Figure 1:
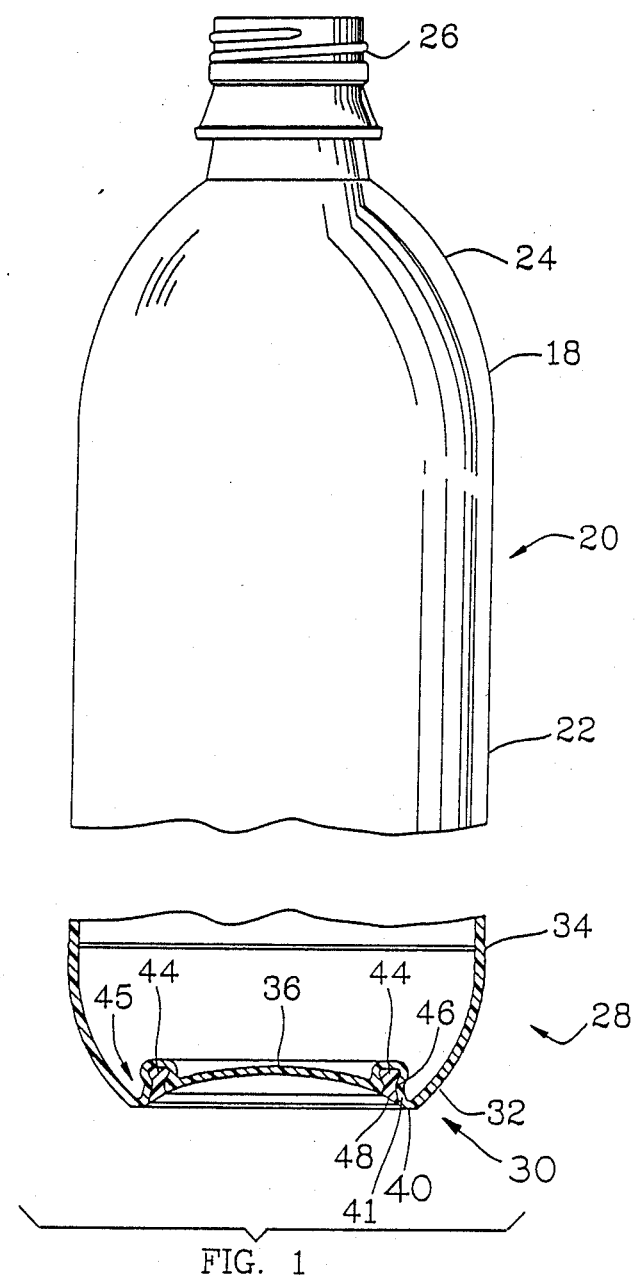
FIG. 1 is a partial sectional side elevational view of a plastic container having a reinforcing ring in the base thereof.

A plastic container having a reinforcing ring in the base according to this invention is indicated at 20 in FIG. 1. The container 20 includes a hollow plastic bottle 18 having a tubular side wall 22 which is merged at its upper end with a shoulder portion 24 tapering into a threaded neck 26 forming an opening at the uppermost point of the container 20. The bottle 18 further includes a base structure 28 which extends downwardly from the lower end of the tubular side wall 22 and closes the bottom end of the container. The base structure 28 includes a bottom wall 30 which is comprised of a convex outer wall portion 32 and a generally circular polar or inner wall portion 36.

The convex outer wall portion 32 is merged at its upper end with the lower end of the tubular side wall 22 at 34. The circular inner wall 36 has a concave outer surface and projects upwardly into the container so as to form a center dome section which is disposed above the outer periphery, or boundary section 41, of the inner wall portion 36. The outer periphery of the circular inner wall is merged with the lower end of the convex outer wall 32 forming a convex heel portion 40. As shown in FIG. 1, the bottom surface of the heel 40 lies in a plane at the lowermost point of the container 20. This surface engages a horizontal surface upon which the container 20 is supported in an upright manner.

The inner wall 36 is strengthened by an annular reinforcing ring 44 molded into the inner wall 36 adjacent the periphery 41 of the inner wall 36. The reinforcing ring 44 has a generally hour glass shaped cross section which enables the plastic material of the inner wall 36 to be molded around the ring 44 and engage the ring at the narrow middle portion 46 of the hour glass cross section to retain the ring in place in the base structure 28. The bottom surface 48 of the ring 44 is sloped radially outwardly and downwardly so as to merge smoothly with the contour of the exterior surface of the concave dome of the inner wall 36.

The reinforcing ring 44 is injection molded of polyethylene terephthalate (PET). Other materials can be used to mold the ring 44 such as PVC, nylon, polycarbonate, polyethylene, polypropylene and the like. It is advantageous to use the same material for the reinforcing ring as used to blow mold the bottle 18, typically PET. By employing the same material in the bottle and the reinforcing ring, the ring and the bottle will not have to be separated from one another before recycling of the individual components.

The ring 44 reinforces the base structure 28, preventing or reducing deformation of the base structure caused by internal carbonation pressures which tend to evert the polar portion 36. The weight of the ring 44 is less than the weight of a base cup used for a comparable sized container, thus reducing the amount of material used to produce the container 20.

When the container 20 is filled with a carbonated beverage, pressure in the container exerts a downward force on the inner wall portion 36 tending to evert the inner wall portion 36. To evert, the periphery of the inner wall 36 must deflect radially outwardly. This exerts a radially outward force on the ring 44. The pressure in the annular channel 45, radially outward of the ring 44, exerts a radially inward force on the ring 44 which opposes the radially outward force on the ring. The pressure within the bottle is thus used to maintain the ring in an assembly relation with the bottle in which the ring reinforces the base and acts to maintain the structural integrity of the base by resisting eversion of the base.

Figure 2:
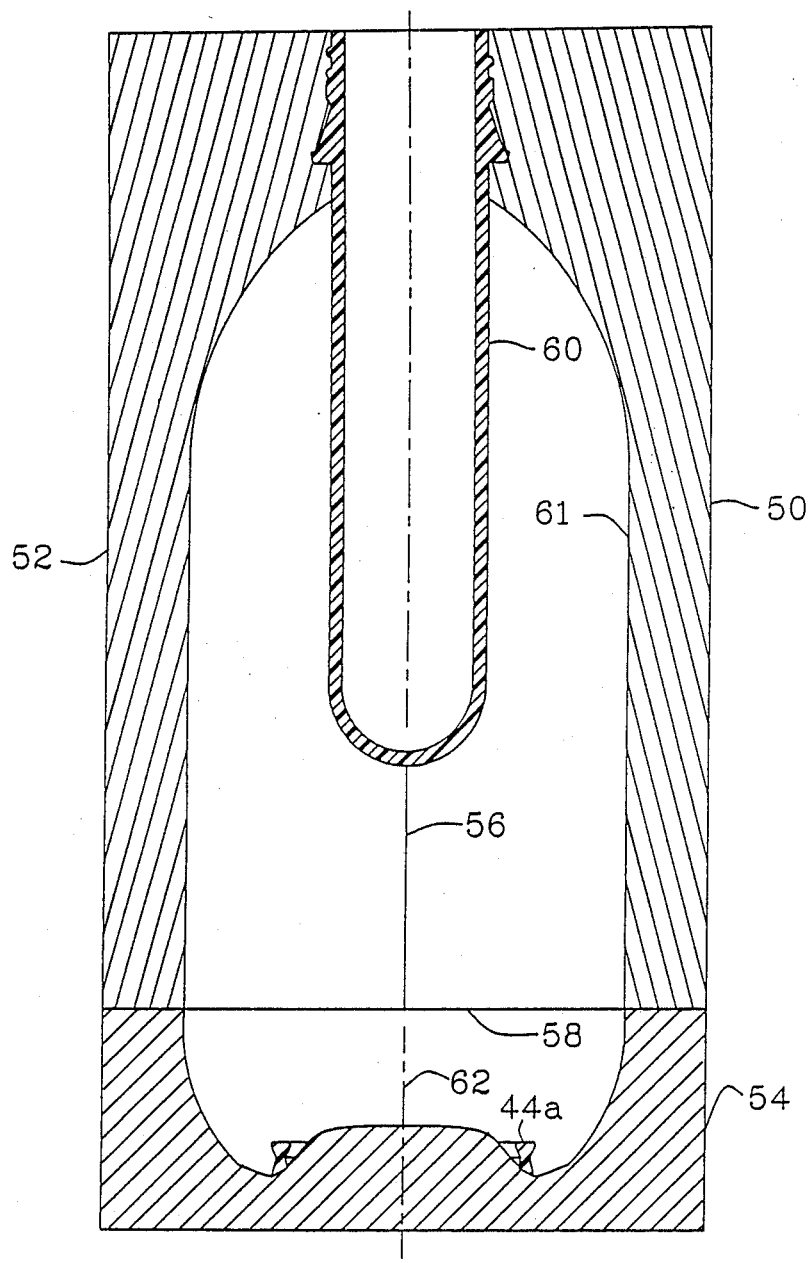
FIG. 2 is a sectional view of a blow mold cavity with a preform and reinforcing ring therein for molding the container of FIG. 1.
Figure 3:
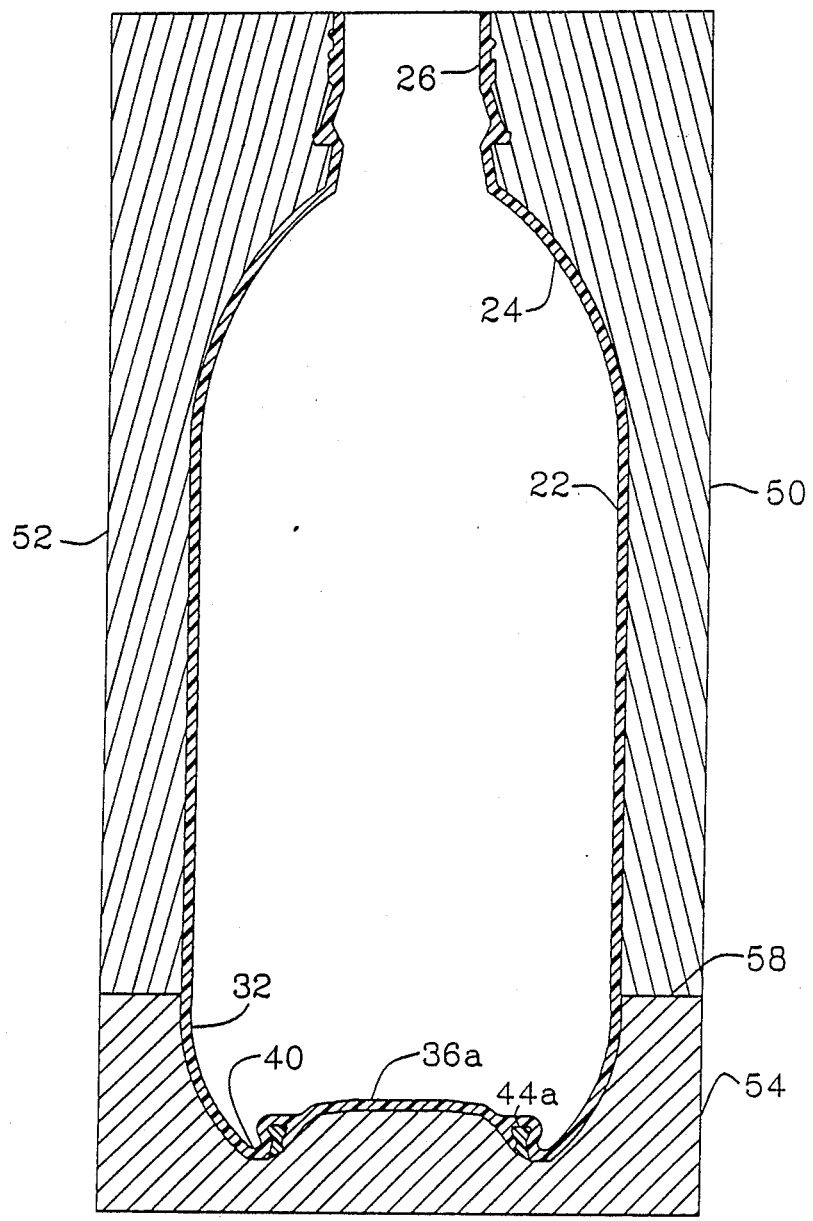
FIG. 3 is a sectional view similar to FIG. 2 in which the preform has been blow molded so as to encapsulate the reinforcing ring in its base.

The process for manufacture of the container 20 is shown in FIGS. 2 and 3. The bottle 18 is blow molded in a mold shown in section in FIG. 2. The mold includes mold halves 50 and 52 and a mold base 54. The two mold halves 50 and 52 are separable from one another along a parting line 56. The mold base 54 is separable from the two mold halves 50 and 52 along a parting line 58. When the mold halves and base are in the closed position, shown in FIG. 2, they define a mold cavity having a surface 61 which corresponds to the exterior surface of the molded bottle 18.

A hollow injection molded plastic preform 60 is placed in the top of the mold cavity and the mold halves are closed around the neck portion of the preform. When placed in the mold, the preform is at a proper temperature for blow molding the plastic preform into the shape of the bottle. A reinforcing ring 44a, similar to ring 44, is also placed in the mold cavity on the base portion of the mold and positioned concentric to the longitudinal axis 62. Pressurized air is injected into the interior of the preform 60, expanding it outward into contact with the surface 61 of the mold cavity. While the pressurized air is being injected into the preform, the air in the mold cavity between the surface 61 and the preform 60 is vented from the mold cavity by vent openings in the mold (not shown).

The molded container is shown in FIG. 3 after the preform has been blow molded to form the hollow bottle of the container. The base portion includes an inner wall 36a which is molded around the ring 44a and engages the ring 44a. The plastic material in the inner wall 36a flows around the ring 44a and into contact with the narrow portion of the cross section of the ring. The ring 44a is thus encapsulated in the inner wall 36a of the base structure. The ring 44a can be heated prior to placing the ring in the blow mold cavity. Heating the ring will prevent the preform plastic material from cooling too rapidly as it contacts the ring and sticking to the ring.

FIGS. 4-10 show various modified embodiments of bottle bases with reinforcing rings which can be used as alternatives to the reinforcing rings 44 and 44a to provide mechanical or frictional engagement with the base structure of the bottle. In each embodiment, the ring reinforces the base to resist eversion of the inner wall. In FIGS. 4-10, similar components of the container which are modified from those shown in FIG. 1 are given the same reference numeral followed by an alphabetic suffix.

Figure 4:
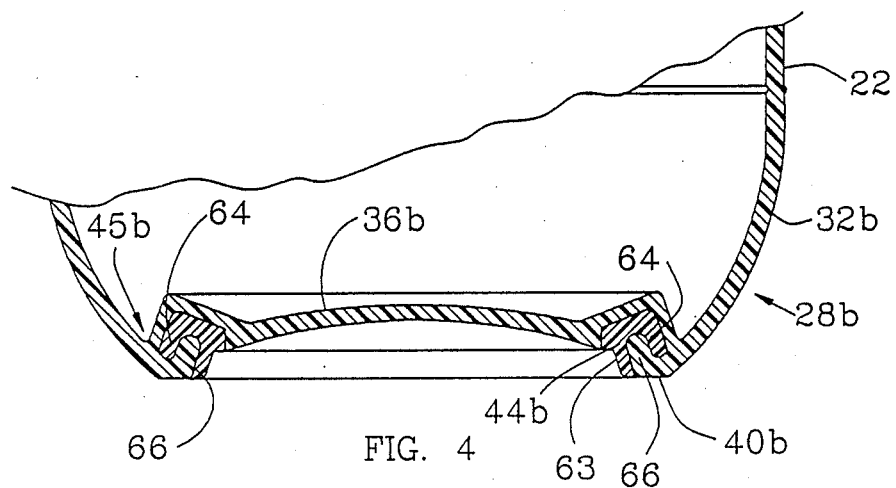
FIG. 4 is a sectional view of a container base having a reinforcing ring molded therein.

In FIG. 4, the ring 44b is of a generally inverted U-shape in cross section. The ring 44b has a radially inner leg 63 which extends downwardly a greater distance than the outer leg 64. The leg 63 rests on the surface of the blow mold in which the container is formed. When the preform is blow molded, the plastic material flows around the leg 64 and upwardly into the annular space between the circular legs 63 and 64 forming an upwardly extending rim 66 which mechanically engages with the ring 44b to hold the ring in place in the inner wall 36b.

Figure 5:
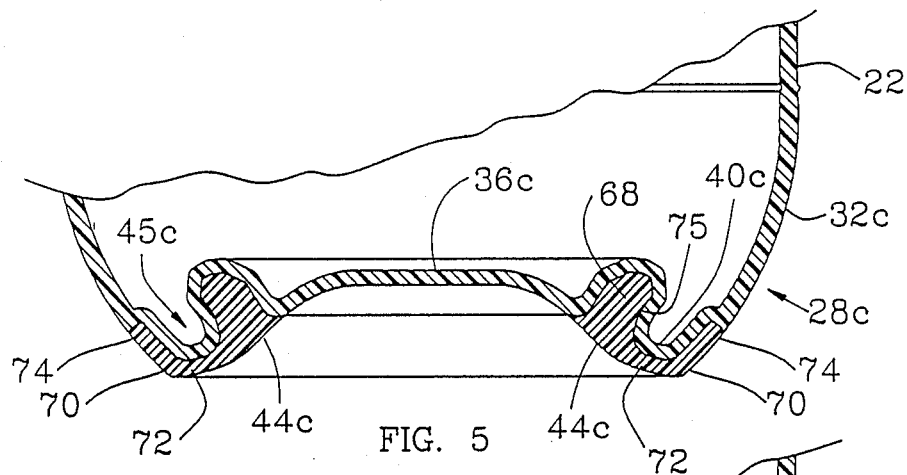
FIG. 5 is a sectional view like FIG. 4 showing a modified form of the reinforcing ring.

The reinforcing ring 44c, shown in FIG. 5, includes an annular main body portion 68 and a rim 70 which extends downwardly and radially outwardly from the main body 68 at 72 and then curves upwardly and outwardly at 74. The radially outer surface of the main body 68 has an undercut 75 so that when the preform is blow molded, the plastic will flow around the main body 68 and into the undercut 75 to mechanically engage the ring 44c. The rim 70 covers the lower surface of the heel 40c where the periphery of the inner wall 36c merges with the lower end of the outer wall 32c. The rim 70 extends upwardly along the exterior edge of the outer wall 32c providing a smooth exterior surface for the container. The ring 44c not only serves to reinforce the base structure 28c, but also provides a support surface engaging area for the container upon which the container is supported in an upright position on a horizontal surface.

Figure 6:
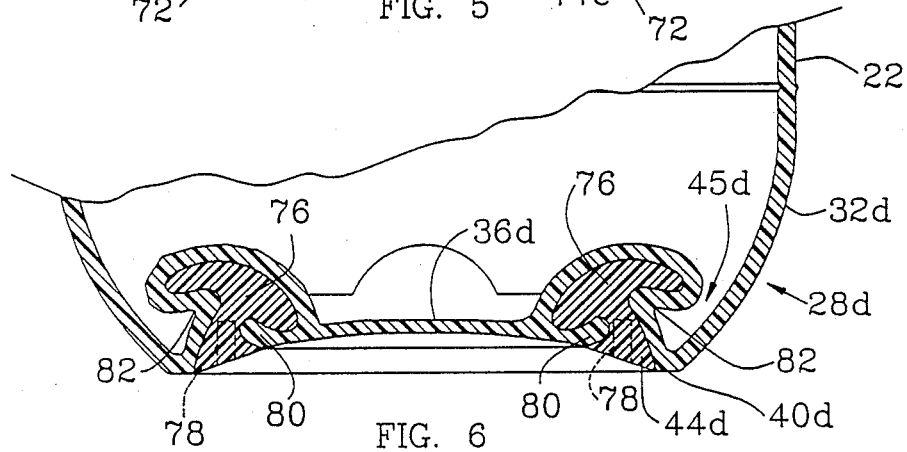
FIGS. 6-8, inclusive, are sectional views like FIGS. 4 and 5 showing other container bases with modified forms of the reinforcing ring.

FIG. 6 shows a reinforcing ring 44d which has a generally rectangular shape cross section main body 78 and projections having enlarged, mushroom-shaped upper portions 76 circumferentially spaced at 90° intervals around the main body 78. When the preform is blow molded, the plastic material of the preform flows around the mushroom shaped upper portions 76 forming rims 80, and 82 underneath the upper portions 76 so as to encapsulate the upper portions 76 to mechanically engage the ring 44d to hold it in the base structure 28d.

Figure 7:
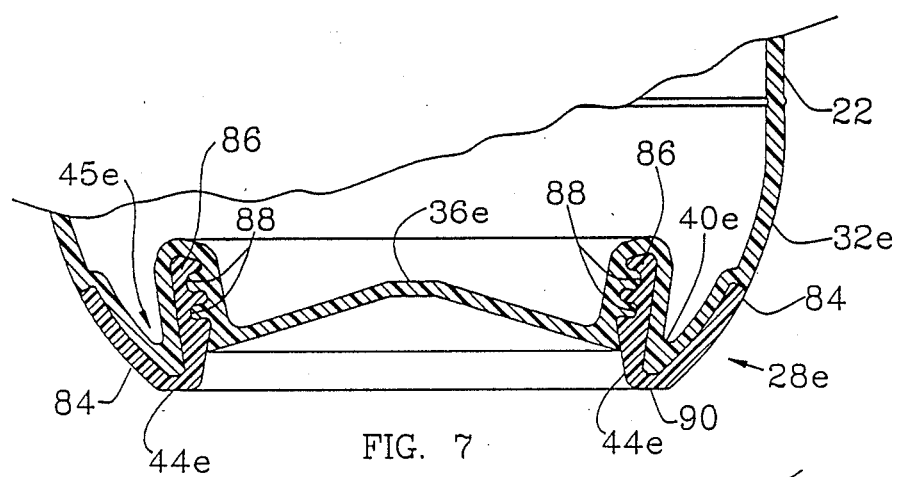

FIG. 7 shows a reinforcing ring 44e which is generally V-shaped in cross section having a radially outer leg 84 and a radially inner leg 86. The leg 86 includes two annular grooves 88 along its inner surface. The plastic material of the inner wall 36e flows into the grooves 88 during molding of the bottle to mechanically engage the ring 44e. The outer leg 84 extends upwardly along the exterior surface of the outer wall 32e. The lowermost surface 90 of ring 44e, forms a lowermost planar surface upon which the container is supported in an upright position.

Figure 8:
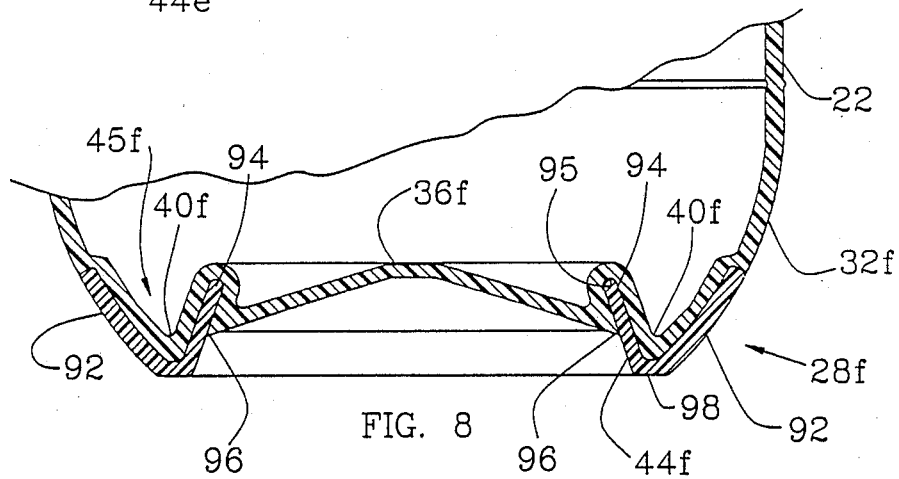

FIG. 8 shows a reinforcing ring 44f which is also generally V-shaped like ring 44e. The ring 44f includes a radially outer leg 92 and a radially inner leg 94. When the preform is molded, the plastic material is molded around the leg 94 forming an annular recess 95 and an annular rim 96 under the radially inner leg 94. The rim 96 thus mechanically engages with the ring 44f to retain it in place in the base structure 28f. The lowermost surface 98 of the ring 44f forms a lowermost planar surface upon which the container is supported in an upright position. Legs 84 and 92 of rings 44e and 44f respectively also provide smooth exterior surfaces merging with the exterior surfaces of outer walls 32e and 32f.

Figure 9:
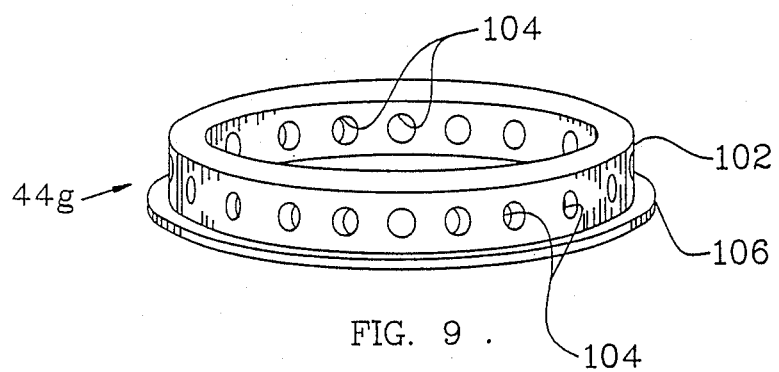
FIG. 9 is a perspective view of a reinforcing ring for the container of this invention having weight reduction holes formed therein.

FIG. 9 illustrates a reinforcing ring 44g which includes a main body portion 102 having a plurality of radially extending holes 104 through the body 102. The holes 104 are used both to reduce the weight of the ring 44g and are also used to provide openings into which the plastic material of the preform can flow to mechanically engage the ring 44g. The ring 44g also includes a radially outwardly extending flange 106 at the base of the main body 102.

Figure 10:
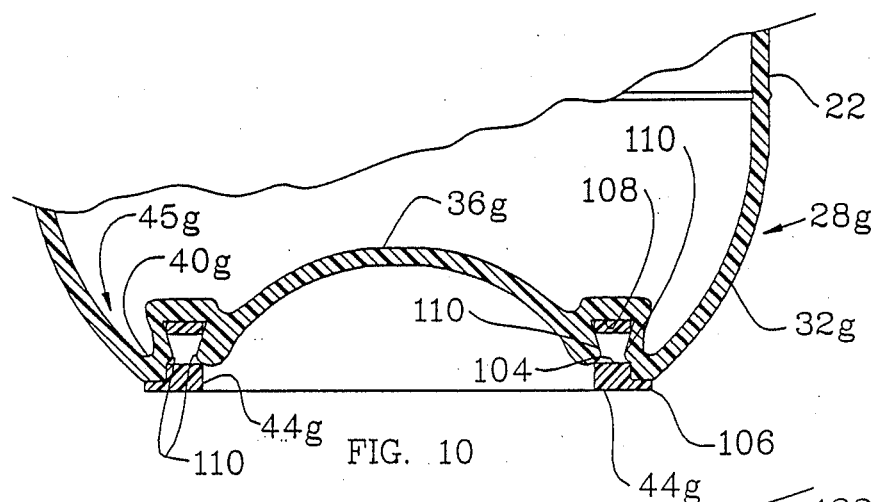
FIG. 10 is a sectional view of a container base molded with the reinforcing ring of FIG. 9 therein.

FIG. 10 shows the base structure 28g of a container having the reinforcing ring 44g therein. The base 28g is molded around the ring such that a recess 108 is formed in the base with the plastic along both sides of the recess 108 flowing into the holes 104 as shown at 110. The plastic flowing into the holes mechanically engages the reinforcing ring 44g holding it in place in base structure 28g. The exterior surface of the heel portion 40g of the base structure is covered by the flange 106 of the ring 44g.

The above examples illustrate that various shapes can be used for the reinforcing ring 44 to strengthen the base structure of a container. The size of the container and its application will determine the size and shape of the reinforcing ring to provide the necessary strength. In each example, the pressure in the annular channel 45 surrounding the ring acts on the ring to resist expansion of the ring to prevent the inner wall 36 from everting.

Figure 11:
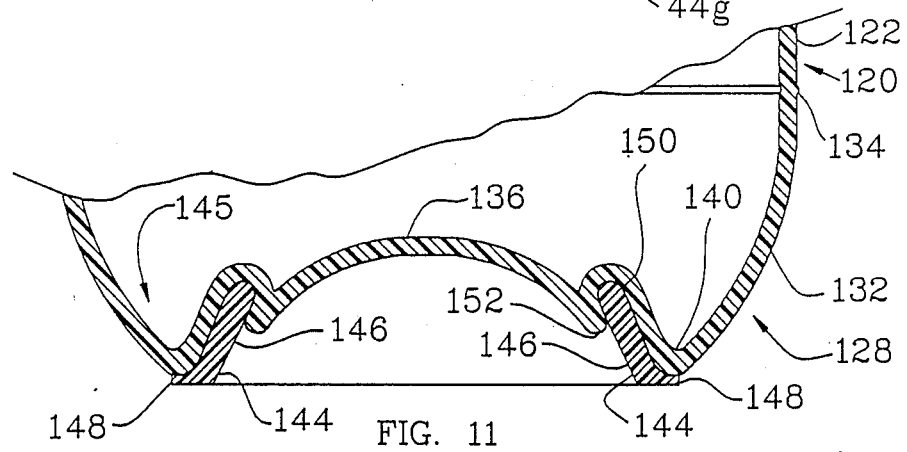
FIG. 11 is a sectional view of a container base in which the reinforcing ring is adhesively bonded to the container base.
Figure 12:
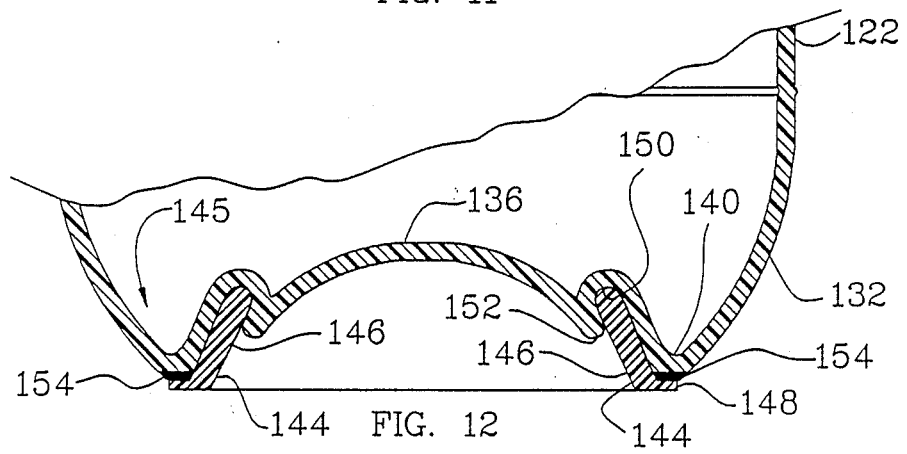
FIG. 12 is a view similar to FIG. 11 in which the reinforcing ring is adhesively bonded to the container base.
Figure 13:
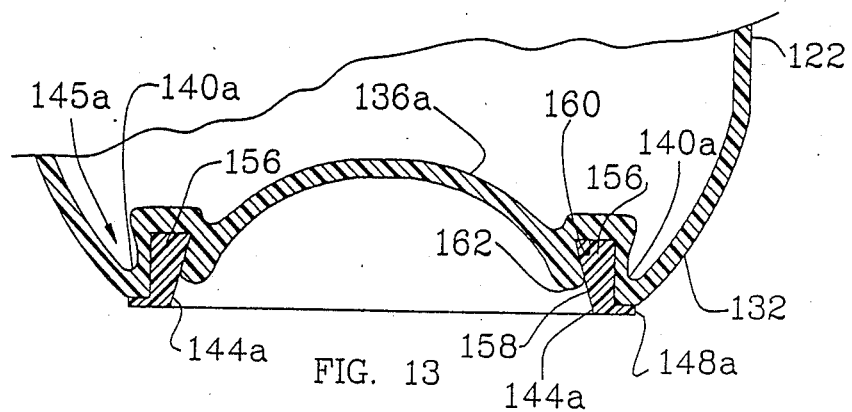
FIG. 13 is a view similar to FIG. 11 in which the reinforcing ring is of a modified shape.

Other methods can be used to manufacture a container with a reinforcing ring in the base other than molding the body of the container around the reinforcing ring. A plastic bottle can be molded with a base shaped such that a suitably shaped reinforcing ring can be snap fit into the base. FIGS. 11-13 illustrate containers with snap fit reinforcing rings. Components of the containers in FIGS. 11-13 which are similar or identical to components of the containers in FIGS. 4-10 are given identical reference numerals with the addition of one hundred.

The container 120 of FIG. 11 includes a tubular side wall 122 which is closed at its lower end by a base structure 128. The base structure includes a convex outer wall 132, which merges at its upper end with the lower end of the side wall 122 at 134, and a generally circular inner wall 136. The periphery of inner wall 136 is merged with the lower end of the convex wall 132 forming a heel portion 140.

The bottle is blow molded such that the inner wall 136 has a concave outer surface forming a dome extending upwardly into the interior of the container 120. The dome includes an annular recess 150 projecting upwardly into the bottle. A downwardly extending annular rim 152 forms the radially inner edge of the recess 150. The reinforcing ring 144 includes a main body 146 which is inclined radially inwardly and upwardly and a horizontal flange portion 148 extending radially outward from the lower end of the body 146. The flange 148 is positioned directly below the heel 140 of the bottle. Flange 148 thus serves as a support ring upon which the container is supported in an upright manner.

The ring 144 is snap fit into the base of the container by pushing the upper portion of body 146 into the recess 150. When the body 146 is pushed into the recess, the rim 152 deflects to allow the body 146 to completely seat in the recess 150. The ring 144 is thus frictionally engaged with the base structure to hold the ring in place. As described above, the pressure within the container is used to maintain the ring in assembly relation with the bottle in which the ring reinforces the base and acts maintain the structural integrity of the base by resisting eversion of the base.

FIG. 12 shows a container 120 and a reinforcing ring 144 identical to the container and ring shown in FIG. 9. An adhesive layer 154, however, has been added to bond the flange 148 to the heel 140 of the plastic bottle. The adhesive layer 154 provides additional strength to prevent the heel portion 140 from rolling outward in response to hydrostatic forces within the container. A polyester based adhesive is preferred.

FIG. 13 illustrates another base structure with a snap fit reinforcing ring in which components similar to those in the base structure of FIGS. 11 and 12 are designated by like reference numerals followed by the suffix "a". The ring 144a includes a wedge shaped main body portion 156 having a radially inner surface 158 which slopes inwardly and upwardly. The body portion 156 snaps into an upwardly projecting annular recess 160 in the inner wall 136a. Annular rim 162 forms the radially inner side of the recess 160. The rim 162 engages the wall 158 of the ring 144a to frictionally engage the ring to hold the ring in place. The ring also includes a radially outwardly extending horizontal flange 148a beneath the heel 140a of the container. The flange 148a forms a lowermost planar surface upon which the container is supported in an upright manner.

Figure 14:
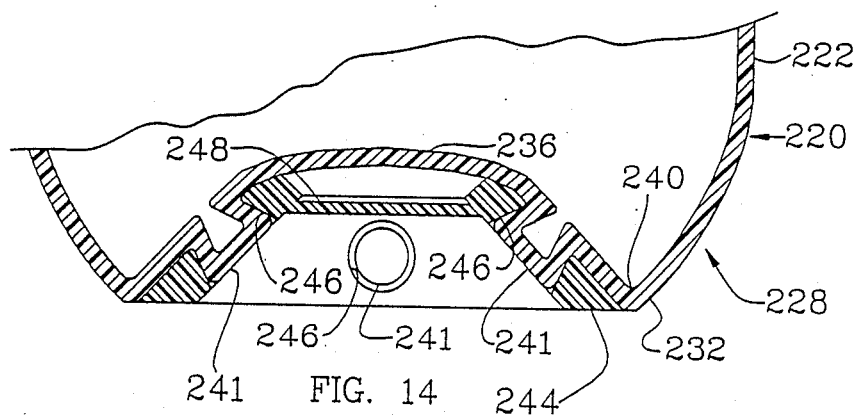
FIG. 14 is a sectional view of a container base having a reinforcing ring including a diametrically extending rib in the ring.

Another container 220 is shown in FIG. 14. The base structure 228 includes a convex outer wall 232 and a concave inner wall 236 forming a dome portion. The inner wall 236 and convex outer wall 232 merge together at the periphery of the inner wall 236 and the lower end of the convex outer wall 232 forming a heel portion 240. The inner wall 236 is molded with a plurality of hollow projections 241 which project from the concave exterior surface of the inner wall 236 adjacent to the heel portion 240. The reinforcing ring 244 includes a plurality of openings 246 which are designed to snap fit around the projections 241 on the inner wall 236 and frictionally engage the wall 236. Carbonation pressure within the projections 241 forces the projections 241 to expand and maintain engagement with the openings 246 in the ring 244 to maintain the ring in an assembly relation with the bottle. To provide additional strength to the ring 244, one or more diametrical ribs 248 extend across the ring 244. A reinforcing ring having diametrical ribs 248 can be used with larger containers having greater strength requirements.

The reinforcing ring in the base structure of the container enables the manufacture of a PET container without a polyethylene base cup. This avoids the higher cost of raw materials and the required separation of components before recycling. The ring provides increased strength to the base without requiring a number of exterior ribs on the outer side of the container as in the Adomaitis container. In addition, the possibility of stress cracking is reduced or eliminated. Once the container is filled with a carbonated beverage, pressure within the bottle acts upon the ring, in such a manner so as to aid the ring in resisting the pressure forces tending to evert the inner wall.

It is to be understood that the invention is not limited to the exact construction and methods illustrated and described above, but that various changes and modifications may be made without departing from the spirit and scope of the invention as defined in the following claims.

We claim:

1. A plastic container for carbonated liquid having a tubular side wall and a base structure merging with a lower end portion of the side wall, said base structure comprising:

a bottom wall extending downwardly from said side wall and closing said container, said bottom wall having a raised center portion forming an annular heel portion at the periphery of said center portion;

said center portion having an upwardly extending annular recess adjacent to and radially inwardly of said heel portion; and an annular reinforcing ring seated in said recess, said recess being configured to engage and encapsulate a portion of said ring, said bottom wall being flexible so that when said container is filled with said carbonated liquid, the bottom wall forming said recess is forced against said ring to secure said ring to said bottom wall, said ring strengthening said bottom wall to resist eversion of said raised center portion.

2. The container of claim 1 wherein said bottom wall is configured so that a portion of said bottom wall forming said recess is vertically below said encapsulated ring portion to mechanically engage said ring to retain said ring in place prior to filling said container with said carbonated liquid.

3. The container of claim 1 wherein said reinforcing ring is of a shape in cross section such that it has a center section of reduced thickness relative to its upper and lower ends and substantially the entire ring is encapsulated in said bottom wall.

4. The container of claim 1 wherein said reinforcing ring is of generally inverted "U" shape in cross section having two generally downwardly directed legs with an annular space therebetween, one of said legs being shorter than the other leg so as to enable the bottom wall to be molded around said shorter leg and into the annular space between said legs.

5. The container of claim 1 wherein said reinforcing ring includes a main body portion having an annular undercut along the radially outer surface of said main body portion to enable said bottom wall to be molded into said undercut to mechanically engage said ring, said ring further including an annular rim extending radially outwardly from said main body portion, said rim being positioned beneath said bottom wall and forming a lowermost planar surface upon which said container is supported in an upright position.

6. The container of claim 1 wherein said reinforcing ring includes a main body and a plurality of circumferentially spaced projections extending upwardly from said main body, said projections having enlarged upper portions which enable the bottom wall to be molded around said enlarged upper portions and mechanically engage said ring.

7. The container of claim 1 wherein said reinforcing ring is generally "V" shape in cross section having radially inner and outer upwardly extending legs, said bottom wall surrounding a portion of said radially inner leg and engaging said ring to encapsulate said inner leg portion, said ring forming a lowermost planar surface upon which said container is supported in an upright position.

8. The container of claim 7 wherein said inner leg of said reinforcing ring includes at least one annular groove into which said bottom wall is molded to mechanically engage said ring.

9. The container of claim 1 wherein the reinforcing ring includes a lowermost planar surface for engagement with a surface upon which said container is supported in an upright position.

10. The container of claim 1 wherein said reinforcing ring includes a main body portion having a plurality of holes extending therethrough to enable the bottom wall to project partially into said holes to mechanically engage said ring.

11. The container of claim 1 wherein said bottom wall forming said annular recess when the container is empty, is resilient to enable said ring to be snap-fit into said recess.

12. The container of claim 11 wherein said reinforcing ring includes a main body, at least a portion of said main body being inserted into said recess in said bottom wall, said ring further including a radially outwardly extending flange forming a lowermost planar surface upon which said container is supported in an upright manner.

13. The container of claim 11 further comprising an adhesive layer between said bottom wall and at least a portion of said reinforcing ring.

14. The container of claim 1 wherein said reinforcing ring includes at least one diametrical rib extending across said ring, said rib being spaced from said bottom wall.

15. A plastic container for carbonated liquid comprising:
a hollow plastic body having a tubular side wall with a lower end and a bottom wall extending downwardly from said lower end of said side wall forming a closed end of said plastic body, said bottom wall having a convex outer wall portion with upper and lower ends, the upper end of said outer wall portion merging with the lower end of said side wall and a concave circular inner wall portion with a peripheral edge merging with the lower end of said outer wall portion, said inner and outer wall portions forming a convex heel portion at the merger of said inner and outer wall portions;
said inner wall portion having an annular recess projecting inwardly into said container adjacent to said heel portion; and
an annular plastic reinforcing ring, a portion of said ring being seated in said recess, said recess being configured to engage and encapsulate said ring portion to strengthen said bottom wall inwardly of said ring against eversion.

16. The container of claim 15 wherein said reinforcing ring includes a main body, a portion of which is encapsulated in said inner wall, and a flange extending radially outwardly from said main body, said flange being below said bottom wall heel portion and forming a lowermost surface for engagement with a surface upon which said container is supported in an upright manner.

17. A plastic container for carbonated liquid comprising an upright hollow body of generally tubular shape having a lower end portion and a base structure extending downwardly from said lower end portion, said base structure having a bottom wall which closes the lower end of said body and includes an outer wall portion which merges with said body lower end portion and a polar wall portion disposed radially inwardly from said outer wall portion, said polar wall portion having a boundary section merging with said outer wall portion and a central section disposed above said boundary sectional;
an annular recess formed in said bottom wall projecting upwardly into said container, said recess being spaced radially inwardly of said outer wall portion;
an annular reinforcing ring, a portion of said ring being seated in said recess; and
said recess being configured to engage and encapsulate said ring portion so that when said container is filled, a portion of the carbonated liquid therein fills the space between said outer wall portion and said ring exerting pressure on said ring in a direction opposing expansion of the ring and thereby resisting eversion of the central section of said polar wall portion.

18. A plastic container according to claim 17 wherein said reinforcing ring includes an integral radially outwardly extending flange forming a lowermost surface for engagement with a surface upon which said container is supported in an upright manner.

19. A plastic container for carbonated liquids having ga tubular side wall and a base structure merging with a lower end portion of the side wall, said base structure comprising:
a bottom wall extending downwardly from said side wall and closing said container, said bottom wall having a raised center portion forming an annular heel portion at the periphery of said center portion;
said center portion having an annular recess adjacent to and radially inward of said heel portion, said recess projecting upwardly into said container; and
an annular support ring seated in said recess, said recess being configured to engage and encapsulate said ring portion, said ring extending downwardly below said bottom wall forming a lowermost planar surface upon which said container is supported in an upright position, said bottom wall being flexible so that when the container is filled with said liquid, the bottom wall forming said recess is forced against said ring to maintain the ring in assembly relation with the bottom wall.

20. The plastic container of claim 19 wherein said bottom wall, when the container is empty, is resilient and said recess and said encapsulated ring portion are configured to enable said ring portion to be snap-fit into said recess and retained in place therein.

* * * * *

UNITED STATES PATENT AND TRADEMARK OFFICE
CERTIFICATE OF CORRECTION

PATENT NO. : 4,955,491

DATED : September 11, 1990

INVENTOR(S) : Dennis L. Marshall et al

It is certified that error appears in the above-identified patent and that said Letters Patent is hereby corrected as shown below:

Column 10, Line 26, Claim 17, "sectional" should read --section--.

Column 10, Line 45, Claim 19, "ga" should read --a--.

Signed and Sealed this

Twenty-fourth Day of December, 1991

Attest:

HARRY F. MANBECK, JR.

Attesting Officer      Commissioner of Patents and Trademarks